July 25, 1950     D. E. SEMON     2,516,263
HOOP, TIRE, AND BALING MACHINE
Filed March 10, 1947     2 Sheets-Sheet 1
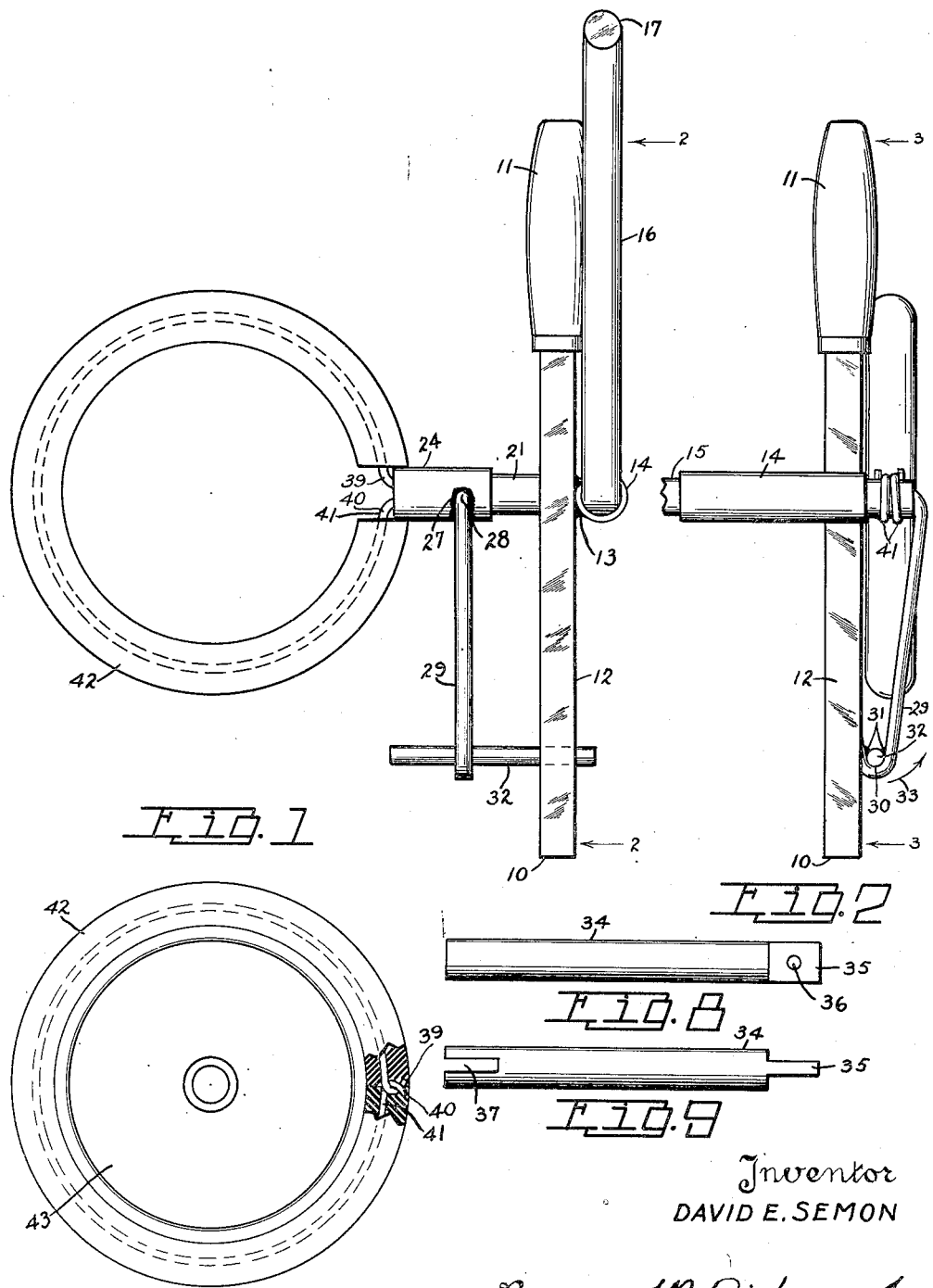
Inventor
DAVID E. SEMON
By J. B. Dickman, Jr.
Attorney July 25, 1950  D. E. SEMON  2,516,263
HOOP, TIRE, AND BALING MACHINE
Filed March 10, 1947  2 Sheets-Sheet 2
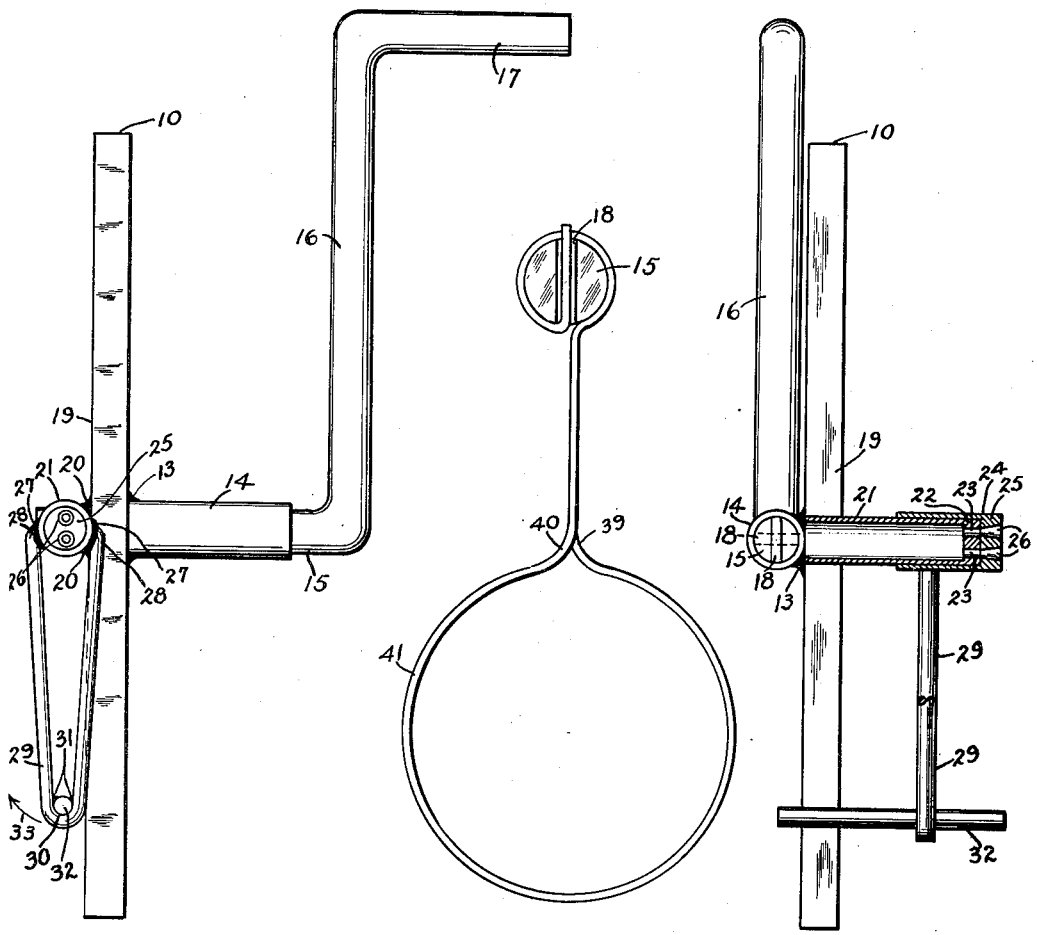
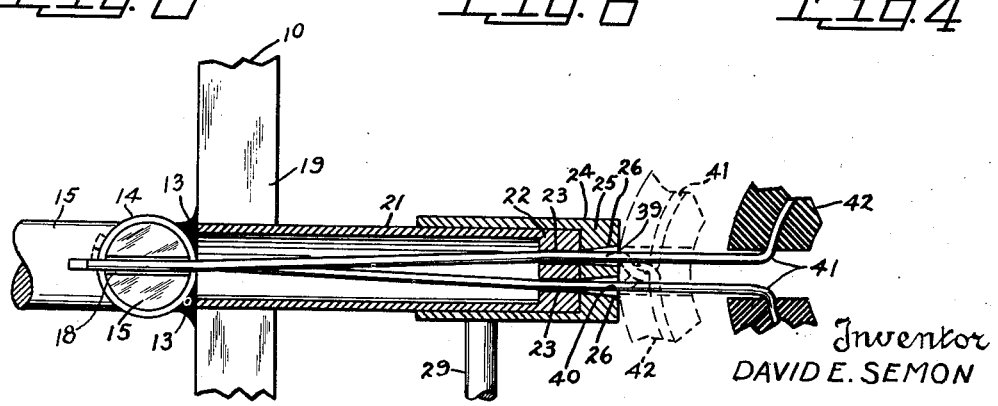
Inventor
DAVID E. SEMON
By J. B. Dickman, Jr.
Attorney Patented July 25, 1950

2,516,263

UNITED STATES PATENT OFFICE 2,516,263

HOOP, TIRE, AND BALING MACHINE

David E. Semon, Jacksonville, Fla.

Application March 10, 1947, Serial No. 733,704

2 Claims. (Cl. 140—123)

The present invention relates to a hoop, tire, and baling device or machine.

It is an object of the present invention to provide a portable, compact, lightweight device for banding boxes, barrels, crates, etc., with a wire, and also to fasten tires to children's scooters, tricycles and other toys having rubber wheels.

Another object of the present invention is the provision of a novel tubular element and cutter.

A still further object of the present invention is the provision of means for receiving a handle on either end.

With these and other objects in view, the invention comprises novel features of construction and arrangement of parts which will be more fully described and claimed.

In the accompanying drawings—

Figure 1 is a front elevational view showing the improved device embodying the invention with a rubber tire in position, the wire at its ends ready to be twisted.

Figure 2 is an elevational view of Figure 1 looking in the direction of the arrows 2—2 on Figure 1.

Figure 3 is an elevational view of Figure 2 looking in the direction of the arrows 3—3, the tire, wire and handle being omitted.

Figure 4 is a rear elevational view of Figure 1, parts being shown in section, the tire, wire and handle being omitted.

Figure 5 is an enlarged sectional view of the section shown in Figure 4 and illustrating the wire positioned in the cutter, needle and in the slot in the crank, the dotted line indicating movement of the tire during the drawing or tightening of the wire, parts being shown fragmentarily.

Figure 6 is a view of a wire having a loop, the ends of the wire engaged in a slot in the crank of the device.

Figure 7 is an elevational view of a wheel with a tire thereon, parts of the tire being broken and in section and illustrating how the ends of the tire are drawn together and the ends of the wire twisted and concealed within the tire.

Figure 8 is a horizontal view of an extension shaft.

Figure 9 is a top plan view of Figure 8.

Referring to the drawings the numeral 10 represents a rod or bar having a suitable handle 11 that is adapted for engagement with either end of the rod or bar 10. Secured to the face 12 of the bar 10 by welds 13 is a tubular element 14 that receives portion 15 of a crank 16, the portion 15 having a bore (not shown) adjacent its end, the end 17 of the crank serving as a handle. The portion 15 of the crank is freely movable in the tubular element 14 and it is provided with a slot 18 for a purpose to be later described. Disposed at right angles to the tubular element 14 and secured to face 19 of the bar 10 by welds 20 is a tubular element 21 having a solid end 22 with bores 23. A cutter 24 slidably engages a portion of the tubular element 21 and it is freely rotatable on the tubular element and it has a solid end portion 25 that is provided with a pair of bores 26 that are tapered. To the outer wall of the cutter 24 there is secured by welds 27, the ends 28 of a V-shaped element 29. Secured in the apex 30 of the element 29 by welds 31 is a handle 32, the element 29 being adapted for manual movement in an upward direction as indicated by the arrow 33 in Figures 2 and 3.

As illustrated in Figures 8 and 9 an extension bar 34 shown, and this bar has a tongue end 35 that is provided with a bore 36, the opposite end having a slot 37, the tongue being adapted for engagement with the slot 18, the bore 36 adapted to align with a bore (not shown) in the portion 15 of the crank 16.

In the operation of the device, if it is to be used with a rubber tire to secure same on a wheel 38 as shown in Figure 7, one end of the rod or bar 10 is secured in a vise (not shown), ends 39 and 40 of a wire 41 that has been threaded through a channel in a tire 42, are threaded through the bores 26 in the cutter 24, through the bores 23 in the needle 21, then to the slot 18 in the portion 15 of the crank, the slot being positioned in alignment with the bores 23 and 26 as shown by the dotted lines in Figure 4 and by the solid lines in Figure 5, the ends being bent either upwardly or downwardly shown by the dotted lines in Figure 5. When the wire 41 has been positioned as shown in Figure 5, one hand of the operator grasps the handle 11 and the other engages the handle 17, the crank 16 is rotated in a clock-wise direction, and during the rotation, the tire 42 is drawn towards the end of the cutter 24 as shown in Figure 5, and during rotation of the crank the ends 39 and 40 of wire 41 wind around the portion 15 as shown in Figure 2. At this point the tire 42 is grasped and it is twisted until the ends 39 and 40 have a sufficient number of twists to insure certain joinder. At this point the tire assumes the position as shown by the dotted lines in Figure 5, the handle 32 of the cutter is then grasped and pulled upwardly in the direction of arrow 33 in Figures 2 and 3. The upward movement of the cutter severs the ends 39 and 40 of the wire 41 assuming the position shown in Figure 7, thus securing the tire 42 to the wheel 43.

If the device is to be used for baling a box or a barrel, the device would be held against the bale or barrel, the crank rotated until the wire is tight, the whole device is then twisted until the ends of the wire have sufficient twists in them, then the cutter is moved to sever the ends.

From the foregoing description, when taken in connection with the accompanying drawings, the advantages of the construction and operation will be apparent to those skilled in the art to which the invention appertains, and I desire to have it understood that the apparatus shown is merely illustrative and that such changes may be made within the scope of the claims hereto appended.

What is claimed is:

1. A device of the character described comprising a bar, a handle engageable with either end of said bar, a tubular element having a pair of bores secured to said bar, a cutter mounted on said tubular element and freely moveable thereon, a handle secured to and depending from said cutter for rotating said cutter on said tubular element, a second tubular element secured to said bar and disposed at right angles to said first named tubular element and said cutter, a crank mounted in said second tubular element, a slot in said crank, said slot adapted for axial alignment with bores in said cutter, the bores in said first named tubular element and cutter and the slot in said crank adapted to receive wires.

2. A device of the character described comprising a bar, a handle engageable with either end of said bar, a tubular element having a pair of bores secured to said bar, a cutter mounted on said tubular element and freely movable thereon, a handle secured to and depending from said cutter for rotating said cutter on said tubular element, a second tubular element secured to said bar and disposed at right angles to said first named tubular element and said cutter, a crank mounted in said tubular element, a slot in said crank, said slot adapted for axial alignment with bores in said cutter, the bores in said first named tubular element and cutter and the slot in said crank adapted to receive wires, whereby rotation of said crank tightens said wire around an article, the article then twisted to twist portions of the wire, said cutter rotated by said depending handle severing the portions of wire from said twist.

DAVID E. SEMON.

REFERENCES CITED

The following references are of record in the file of this patent:

UNITED STATES PATENTS

| Number | Name | Date |
|---|---|---|
| 415,621 | Collins | Nov. 19, 1889 |
| 704,953 | Auld | July 15, 1902 |
| 717,553 | Depew et al. | Jan. 6, 1903 |
| 872,295 | Hixson | Nov. 26, 1907 |
| 954,886 | Rolston | Apr. 12, 1910 |
| 1,336,605 | Becker | Apr. 13, 1920 |
| 1,474,265 | Kenner | Nov. 13, 1923 |
| 1,499,096 | Campbell | June 24, 1924 |